(12) United States Patent  (10) Patent No.: US 8,880,803 B2
Noda  (45) Date of Patent: Nov. 4, 2014

(54) STORAGE DEVICE AND STORAGE-DEVICE CONTROL METHOD

(75) Inventor: Yuji Noda, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 13/330,932

(22) Filed: Dec. 20, 2011

(65) Prior Publication Data

US 2012/0210062 A1  Aug. 16, 2012

(30) Foreign Application Priority Data

Feb. 10, 2011 (JP) ................... 2011-027760

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 9/26* | (2006.01) | |
| *G06F 9/34* | (2006.01) | |
| *G06F 11/10* | (2006.01) | |
| *G06F 11/14* | (2006.01) | |

(52) U.S. Cl.
CPC ...... *G06F 11/1076* (2013.01); *G06F 2201/835* (2013.01); *G06F 11/1441* (2013.01)
USPC ............................ 711/114; 711/112; 711/209

(58) Field of Classification Search
CPC ....... G06F 8/65; G06F 17/30368; G06F 8/67; G06F 8/71; G06F 11/1469; G06F 11/1451; G06F 11/1471
USPC ......................................................... 711/114
See application file for complete search history.

(56) References Cited

U.S. PATENT DOCUMENTS

| | | |
|---|---|---|
| 6,233,648 B1 | 5/2001 | Tomita |
| 7,487,289 B2 | 2/2009 | Ito |
| 7,849,258 B2 | 12/2010 | Sato et al. |

(Continued)

FOREIGN PATENT DOCUMENTS

| | | | |
|---|---|---|---|
| JP | 10-171608 A | 6/1998 | |
| JP | 11-194899 A | 7/1999 | |

(Continued)

OTHER PUBLICATIONS

Japanese Office Action mailed Aug. 19, 2014, for corresponding Japanese Application No. 2011-027760, with Partial English Translation, 10 pages.

*Primary Examiner* — Kenneth Lo
*Assistant Examiner* — Sidney Li
(74) *Attorney, Agent, or Firm* — Fujitsu Patent Center

(57) ABSTRACT

A generation-code storage unit stores therein a generation code in association with identification information for identifying the block datum. A generation-code managing unit assigns a new generation code to a detected consecutive data set and any block datum included in writing data other than the consecutive data set and stores the assigned generation code in the generation-code storage unit. A data writing unit adds the new generation code to the block datum or consecutive data set included in the writing data and writes it to a storage unit. A determining unit determines whether the generation code added to a read block datum or consecutive data set is accordant with the generation code of the read block datum or consecutive data set stored in the generation-code storage unit. A data transmitting unit transmits, when the generation codes are accordant, the read block datum or consecutive data set.

7 Claims, 12 Drawing Sheets

(56) References Cited

U.S. PATENT DOCUMENTS

| | | |
|---|---|---|
| 8,234,446 B2 | 7/2012 | Noguchi et al. |
| 2002/0161972 A1* | 10/2002 | Talagala et al. ............... 711/114 |
| 2003/0103564 A1* | 6/2003 | Hanaki .................... 375/240.03 |
| 2008/0005141 A1* | 1/2008 | Zheng et al. .................. 707/101 |

FOREIGN PATENT DOCUMENTS

| | | |
|---|---|---|
| JP | 2006-252530 A | 9/2006 |
| JP | 2009-64363 A | 3/2009 |
| JP | 4454204 B2 | 2/2010 |
| JP | 2010-182087 A | 8/2010 |

* cited by examiner

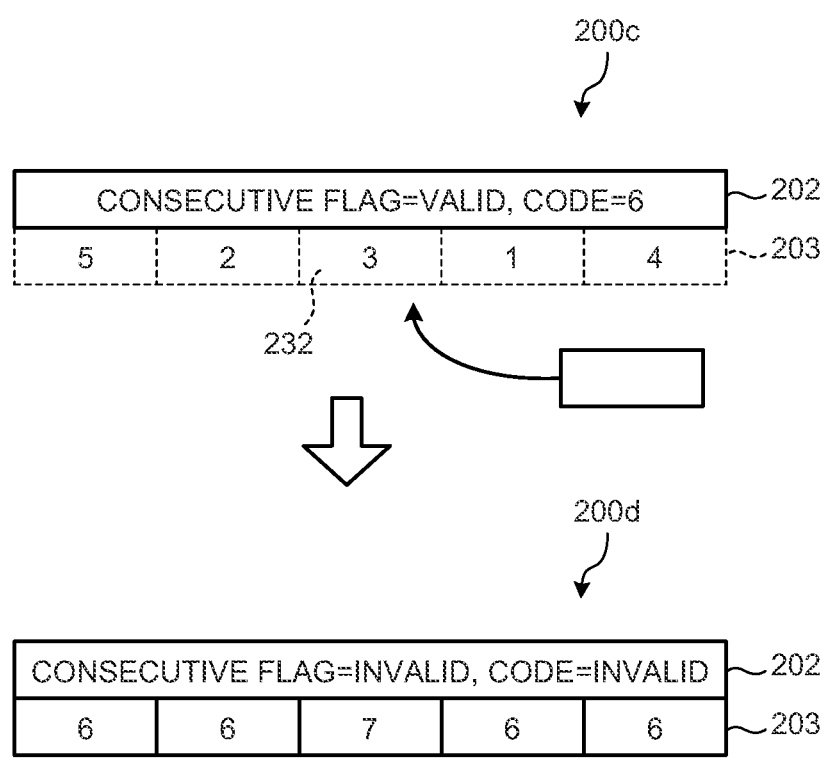

STORAGE DEVICE AND STORAGE-DEVICE CONTROL METHOD

CROSS-REFERENCE TO RELATED APPLICATION

This application is based upon and claims the benefit of priority of the prior Japanese Patent Application No. 2011-027760, filed on Feb. 10, 2011, the entire contents of which are incorporated herein by reference.

FIELD

The embodiments discussed herein are directed to a storage device and a storage-device control method.

BACKGROUND

Recently, there has been a demand for a highly reliable storage device that has a plurality of HDDs (Hard Disk Drives) embedded therein. To satisfy this demand, most storage devices add a check code (DIF: Data Integrity Field) to data that is received from a host, such as a computer. With a check code added therewith, a storage device checks data consistency when data is transferred, for example, when data is written to an HDD, thereby preventing data inconsistency caused by a defective component or the like. With this configuration, storage devices give an assurance on data that is written to an HDD.

A miswriting of data to an HDD may occur in a storage device. A miswriting to an HDD indicates, for example, a data writing error that occurs when writing data to an HDD and that is undetectable by the HDD. Because such a miswriting to an HDD is not detected as an error by the HDD, the HDD does not output a notice indicative of the occurrence of an error, and therefore data stored in the HDD is not updated and old data remains, with the check code remaining as it is. If an assurance given on data in accordance with a check code is used, because the check code indicates that the data is correct, it is difficult to detect the error.

The following technologies have been proposed that solve a miswriting to an HDD. A first technology that prevents miswriting involves writing data to an HDD, then reading data from the same section of the HDD, and then comparing the written data with the read data. A disadvantage with the first technology is that, because the data reading and the data comparing are performed each time data is written to an HDD, the I/O (Input/Output) performance is decreased.

A second conventional technology that avoids miswriting involves performing no special process when data is written to an HDD, but, when data is read, redundant data is read from a RAID and then the RAID is checked for consistency. The second technology is intended for comparing, for example, mirrored data with each other. A disadvantage with the second technology is that, although the occurrence of a miswriting is detectable, the HDD in which the miswriting has occurred is not identified and, therefore, it is difficult to repair the data.

A third conventional technology involves giving, each time data is written, incremented writing information to the data and storing the given writing information and, when data is read, checking whether the stored writing information is accordant with the writing information given to the data. A fourth conventional technology involves adding a check code to each of the data written to different physical disks for data management. A fifth conventional technology involves, when I/O (input/output) to a disk is performed block by block, adding a state updating value indicative of the state of the updating, such as generation and time, to each of the data block by block and then checking, by using the state updating value, the data block by block when the data is read.

Patent Document 1: Japanese Patent No. 4454204
Patent Document 2: Japanese Laid-open Patent Publication No. 10-171608
Patent Document 3: Japanese Laid-open Patent Publication No. 2006-252530

A disadvantage with the third technology, in which incremented writing information is given to data, is that, because writing information is given to all the data and, when the data is read, it is checked one by one, the load of processes for detecting any miswriting is increased. A disadvantage with the fourth technology, in which a check code is added to each of the data written to different physical disks, is that the load of processes for detecting any miswriting is increased. A disadvantage with the fifth technology, in which a state updating value is added to each block, is that, because an error check is made block by block, the probability of errors being detected is reduced and, therefore, the reliability is reduced.

SUMMARY

According to an aspect of an embodiment of the invention, a storage device includes a data receiving unit that receives writing data including at least one block datum having a predetermined size; a generation-code storage unit that stores therein a generation code indicative of a state of updating of the block datum in such a manner that the generation code is associated with identification information for identifying the block datum; a generation-code managing unit that detects, in the writing data, any consecutive data set that includes a predetermined number of consecutive block data, assigns a new generation code to the detected consecutive data set and assigns a new generation code to any block datum included in the writing data other than the consecutive data set, and stores the assigned generation code in the generation-code storage unit; a data writing unit that adds the new generation code to the block datum or consecutive data set included in the writing data and writes it to a storage unit; a data reading unit that reads the block datum or consecutive data set from the storage unit; a determining unit that determines whether a generation code added to the block datum or consecutive data set that is read by the data reading unit is accordant with a generation code of the read block datum or consecutive data set that is stored in the generation-code storage unit; and a data transmitting unit that transmits, when the determining unit determines that the generation codes are accordant, the read block datum or consecutive data set.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a conceptual diagram that explains the way of writing generation codes of block data to a generation control block with the consecutive generation code being valid;

DESCRIPTION OF EMBODIMENTS

Preferred embodiments of the present invention will be explained with reference to accompanying drawings.

Moreover, the storage device and the storage-device control method of the present invention are not limited to the following embodiments.

[a] First Embodiment

Figure 1:
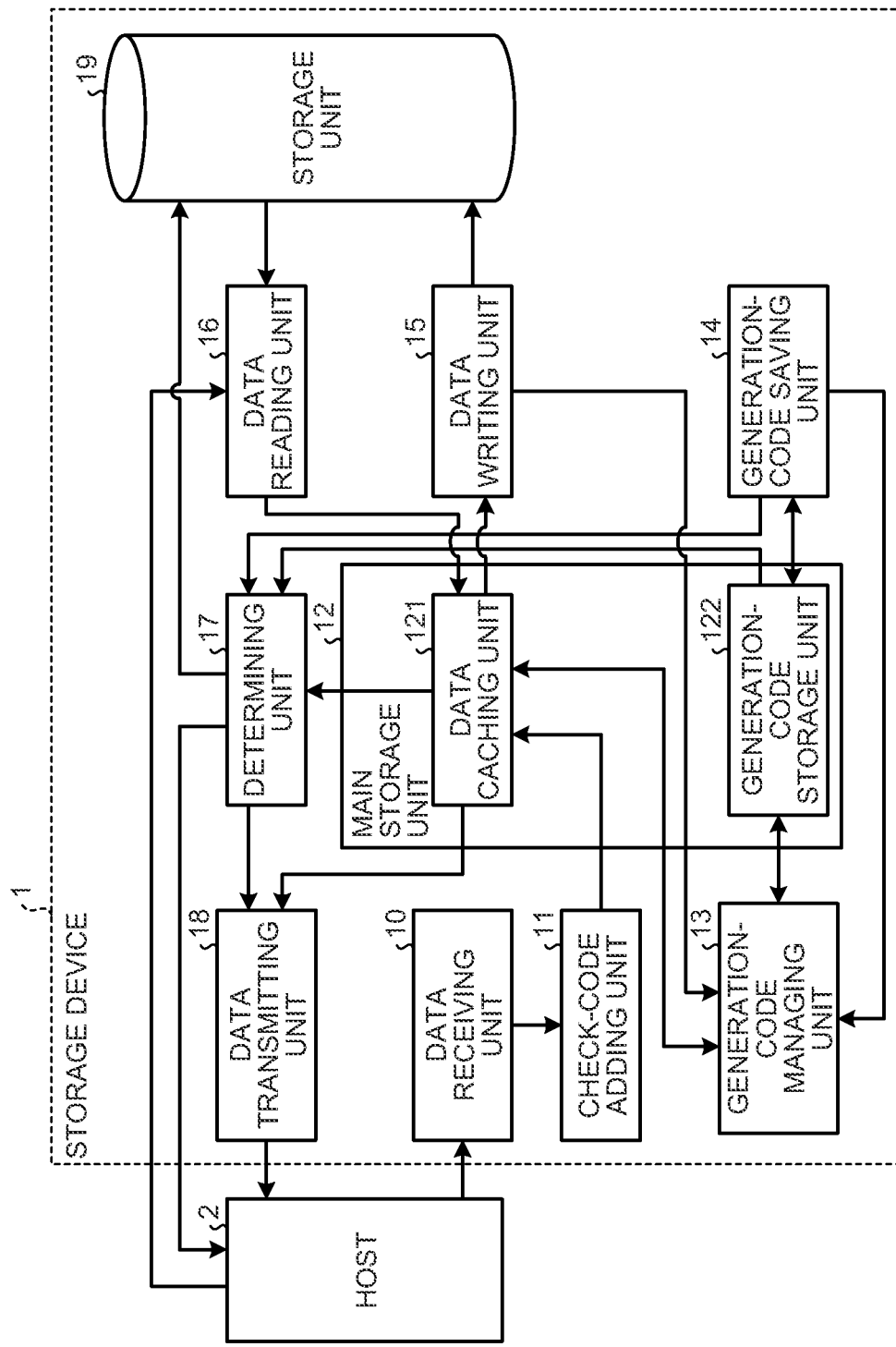
FIG. 1 is a block diagram of a storage device according to the first embodiment.

FIG. 1 is a block diagram of a storage device according to the first embodiment. As illustrated in FIG. 1, a storage device 1 according to the present embodiment includes a data receiving unit 10, a check-code adding unit 11, a main storage unit 12, a generation-code managing unit 13, a generation-code saving unit 14, a data writing unit 15, a data reading unit 16, a determining unit 17, a data transmitting unit 18, and a storage unit 19. The storage device 1 is connected to a host 2 via a network. The storage device 1 transmits/receives data to/from the host 2.

The storage unit 19 has a plurality of HDDs. A plurality of RAIDs (Redundant Arrays of Inexpensive Disks) (array sets) is created by using the HDDs of the storage unit 19. Each of the RAIDs has a RAID number given thereto as an identifier. Each of the RAIDs also has RAID LBAs (Logical Block Addresses) each indicative of a file storage location in the RAID. I/O (input/output) to a disk is performed block by block and the RAID LBA is assigned to each of blocks. In other words, if the RAID number and the RAID LBA of a certain datum are identified, a RAID that includes the datum and a location of the datum in the RAID are identified, i.e., the datum is distinguished uniquely from the other data included in the storage unit 19. In the following, an individual datum having a size equal to one block, i.e., a datum based on which I/O to a disk is performed is sometimes called "block datum".

Figure 2:
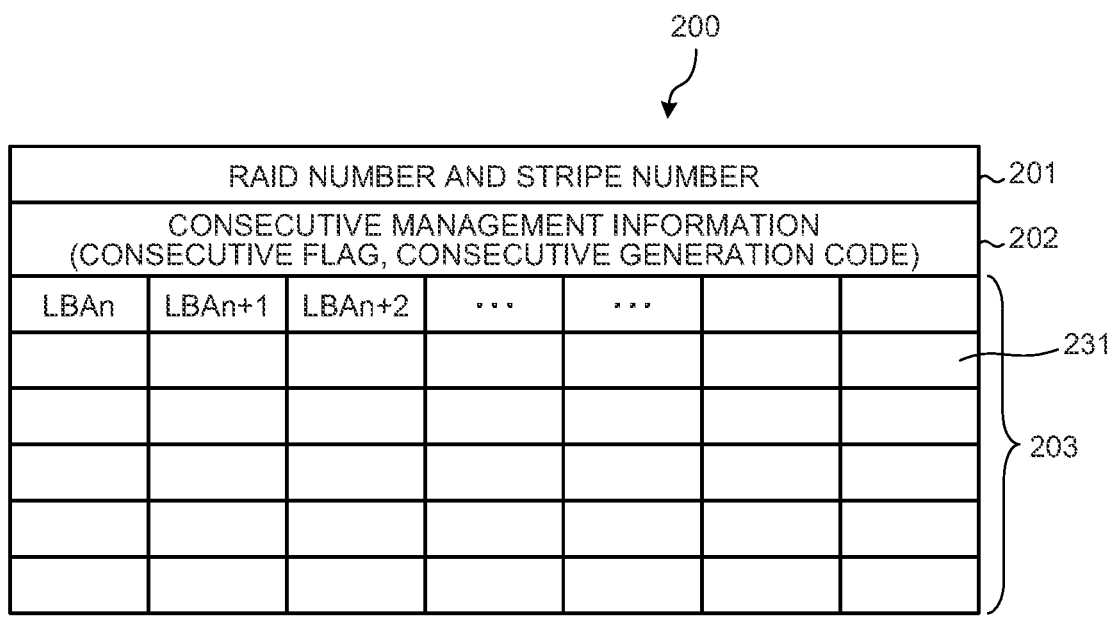
FIG. 2 is a table that explains a generation control block.

The main storage unit 12 is a memory, such as an SDRAM. The main storage unit 12 includes a data caching unit 121 and a generation-code storage unit 122. The generation-code storage unit 122 prestores therein generation control blocks 200 like the table illustrated in FIG. 2. The main storage unit 12 stores therein the date-and-time of the latest access to each of the generation control blocks 200 in association with the respective generation control blocks 200. FIG. 2 is a table that explains the generation control blocks. The generation control blocks 200 are tables that are used to manage the generation code of each of block data. The generation-code storage unit 122 stores therein the generation control blocks each having a predetermined capacity. The generation control blocks 200 will be explained in detail below with reference to FIG. 2.

Each of the generation control blocks 200 has a location-information section 201, a consecutive management section 202, and a generation code table 203. A RAID number and a stripe number are described in the location-information section 201. A flag is described in the consecutive management section 202, the flag indicating whether a consecutive generation code is valid. The consecutive generation code is a value that indicates whether the generation codes of individual block data that are described in the generation code table 203 are treated as one set. If the consecutive generation code is valid, information indicative of the consecutive generation code is described in the consecutive management section 202. The consecutive generation code will be explained in detail later. The generation code table 203 has generation code fields 231 in which generation codes of a predetermined number of block data having consecutive RAID LBAs are described. The number of the generation code fields 231 included in the generation code table 203 of the present embodiment is equal to the number of stripes of a RAID. For a RAID, a stripe is a set of a maximum number of data written at the same time. The number of stripes is equal to, for example, the number of physical hard disks of a RAID to which data is written at the same time.

The number of the created generation control blocks 200 are predetermined to cover all the RAID LBAs of each RAID of the storage unit 19. Suppose, for example, that the storage unit 19 has one RAID that has RAID LBAs from 1 to 100. In other words, this storage unit 19 can store therein 100 block data. If the generation code table 203 can store therein generation codes of 10 block data, the prepared generation control blocks 200 are 10. More particularly, the first generation control block 200 corresponds to the RAID LBAs 1 to 10, the second generation control block 200 corresponds to the RAID LBAs 11 to 20, . . . , and the tenth generation control block 200 corresponds to the RAID LBAs 91 to 100.

The generation-code saving unit 14 is a large-capacity nonvolatile memory. A nonvolatile memory is, for example, an SSD (Solid State Drive), a flash memory, a HDD, etc. The generation-code saving unit 14 stores therein a predetermined number of the generation control blocks 200 so as to cover all the RAID LBAs of each RAID of the storage unit 19 (hereinafter, "generation control blocks equal to the storage capacity"). Although, in the present embodiment, the generation-code saving unit 14 stores therein all the generation control blocks 200 equal to the storage capacity, the configuration is not limited thereto. It is allowable, for example, that some of the generation control blocks 200 stored in the generation-code storage unit 122 are not stored in the generation-code saving unit 14.

The configuration and operation of the data writing side will be explained below. The data receiving unit 10 receives writing data, which is data to be written to the storage unit 19, from the host 2. The writing data includes one or more block data. The block datum corresponds to an example of a "predetermined size". The data receiving unit 10 outputs the received data to the check-code adding unit 11.

The check-code adding unit 11 adds any check codes other than the generation code to each of the block data included in the writing data. The check codes added by the check-code adding unit 11 are, for example, a CRC (Cyclic Redundancy Check), a RAID number, and a flag, a RAID LBA, etc. The check-code adding unit 11 then stores each of the block data added with any check codes other than the generation code in the data caching unit 121 of the main storage unit 12.

The generation-code managing unit 13 receives, from the data writing unit 15, both a notice that block data accumulated in the data caching unit 121 are written to the storage unit 19 and identification information for identifying the written block data. In the following, writing block data that are accumulated in the data caching unit 121 back to the storage unit 19 is sometimes called "writing back". The way will be explained below of processing block data that are indicated by the notice that is received from the data writing unit 15. The generation-code managing unit 13 searches, by using the check codes of the block data, for a generation control block in the generation-code storage unit 122 that has the generation codes of the blocks included in the block data. If no generation codes are added to the block data yet, the generation-code managing unit 13 does not make a search for a generation control block.

If no generation control block is stored in the generation-code storage unit 122 that has the generation codes of the block data, the generation-code managing unit 13 reads, from the generation-code saving unit 14, a generation control block that has the generation codes of the block data. The generation-code managing unit 13 then identifies, by using the access date-and-time stored in the generation-code storage unit 122, a generation control block that has the earliest access date-and-time. The generation-code managing unit 13 moves the generation control block that has the earliest access date-and-time from the generation-code storage unit 122 to the generation-code saving unit 14. With the moving, the generation-code managing unit 13 updates, by using the moved generation control block, a corresponding generation-code control table that is stored in the generation-code saving unit 14. The generation-code managing unit 13 then stores the generation control block that is read from the generation-code saving unit 14 in the generation-code storage unit 122.

The generation-code managing unit 13 determines whether consecutive block data that are stored in the data caching unit 121 including the generation control block indicated by the notice of writing back include all the block data whose generation codes are described in the generation control block. A set of all the block data whose generation codes are described in the same generation code table is called "consecutive data set". In other words, a consecutive data set is a set of block data having the same number of consecutive RAID LBAs as the number of stripes beginning with the head block of a certain generation code table.

Figure 3A:
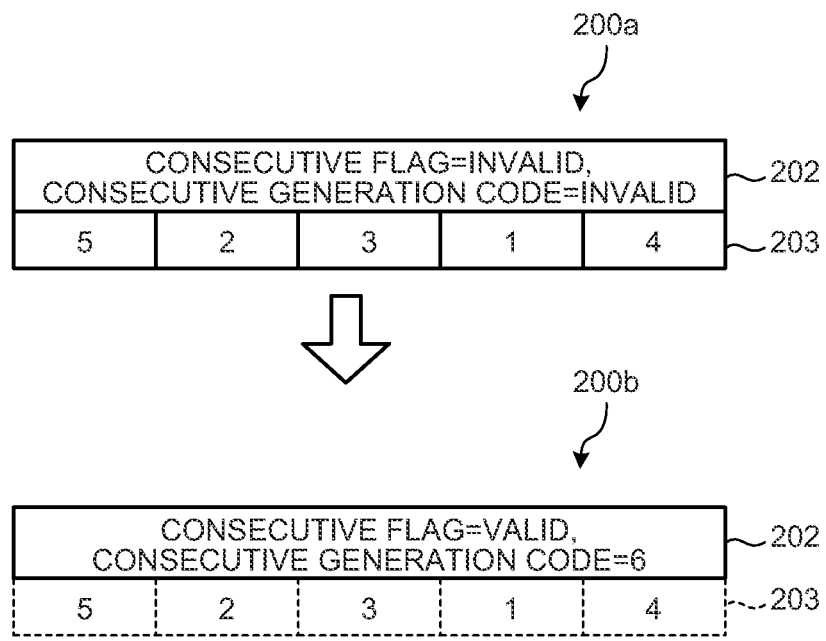
FIG. 3A is a conceptual diagram that explains the way of writing a consecutive generation code to a generation control block.

FIG. 3A is a conceptual diagram that explains the way of writing a consecutive generation code to a generation control block. The consecutive management section 202 and the generation code table 203 of a generation control block are illustrated in FIG. 3A, while the other sections are not illustrated. A generation control block 200a indicates a state before a consecutive generation code is written. A generation control block 200b indicates a state after a consecutive generation code is written. If any consecutive data set is present, the generation-code managing unit 13 checks a flag (hereinafter, "consecutive flag") to determine whether the consecutive generation code in the consecutive management section 202 of a generation control block that corresponds to the consecutive data set is valid. If the consecutive generation code is invalid, i.e., it is in the state of the generation control block 200a of FIG. 3A, the generation-code managing unit 13 sets the consecutive generation code of the consecutive management section 202 to valid. When the consecutive generation code becomes valid, the generation code fields of the individual blocks included in the generation code table 203 become invalid. The dotted line of the generation code table 203 of the generation control block 200b indicates that the generation code fields are invalid. The generation-code managing unit 13 increments by one the maximum value of the generation codes that are described in the generation code table 203 of the generation control block 200a and then writes the incremented value to the consecutive management section as a consecutive generation code. Thus, as illustrated in the generation control block 200b, the consecutive generation code of the consecutive management section 202 becomes valid and the consecutive generation code becomes 6.

Figure 3B:
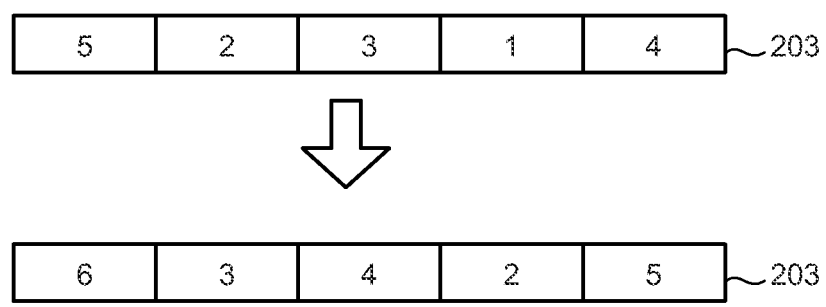
FIG. 3B is a conceptual diagram that explains the way of writing a generation code to a generation control block when the consecutive generation code is unused.

FIG. 3B is a conceptual diagram that explains the way of writing a generation code to a generation control block when the consecutive generation code is unused. The way of updating generation codes when the consecutive generation code is unused will be explained with reference to FIG. 3B. FIG. 3B illustrates only the generation code table 203. FIG. 3B illustrates that the generation codes of the upper table are updated to the generation codes of the lower table, respectively. As illustrated in FIG. 3B, when the generation code of each of the blocks is updated, the generation code of each of the blocks is incremented by one and then the incremented value is written to the corresponding block. Regarding the load, if the consecutive generation code is used, no other actions are performed than checking the consecutive flag and, if necessary, switching the consecutive flag, and then writing the consecutive generation code; therefore, the load for writing the generation code is lower than the load applied when the consecutive generation code is unused.

If the consecutive generation code is valid, the generation-code managing unit 13 increments by one the consecutive generation code described in the consecutive management section and then writes the incremented value.

FIG. 4 is a conceptual diagram that explains the way of writing generation codes of block data to a generation control block with the consecutive generation code being valid. FIG. 4 illustrates a case where the generation code of a generation code field 232 in a generation control block 200c is updated. The generation-code managing unit 13 checks a flag to determine whether a consecutive generation code of a consecutive management section of a generation control block that has the generation code of the block is valid to any blocks included in writing data other than the consecutive data set. If the consecutive generation code is valid, the generation control block is in the state as illustrated in the generation control block 200c of FIG. 4. When the generation code field 232 of the generation control block 200c is updated, the generation-code managing unit 13 sets the consecutive flag to invalid and sets the consecutive generation code to invalid. With this action, as illustrated in the generation code table 203 of a generation control block 200d, the generation code fields having the generation codes of the respective block data become valid. The generation-code managing unit 13 increments the value described in the generation code field 232 by one and then writes the incremented values to the generation code field 232. The generation-code managing unit 13 writes the value that is given as the consecutive generation code to any generation code fields of the generation code table 203 other than the generation code field 232.

If the consecutive generation code is invalid, the generation-code managing unit 13 increments by one the value of a generation code field that has the generation code of the block datum whose generation code is to be updated and then writes the incremented value to the field.

Figure 5:
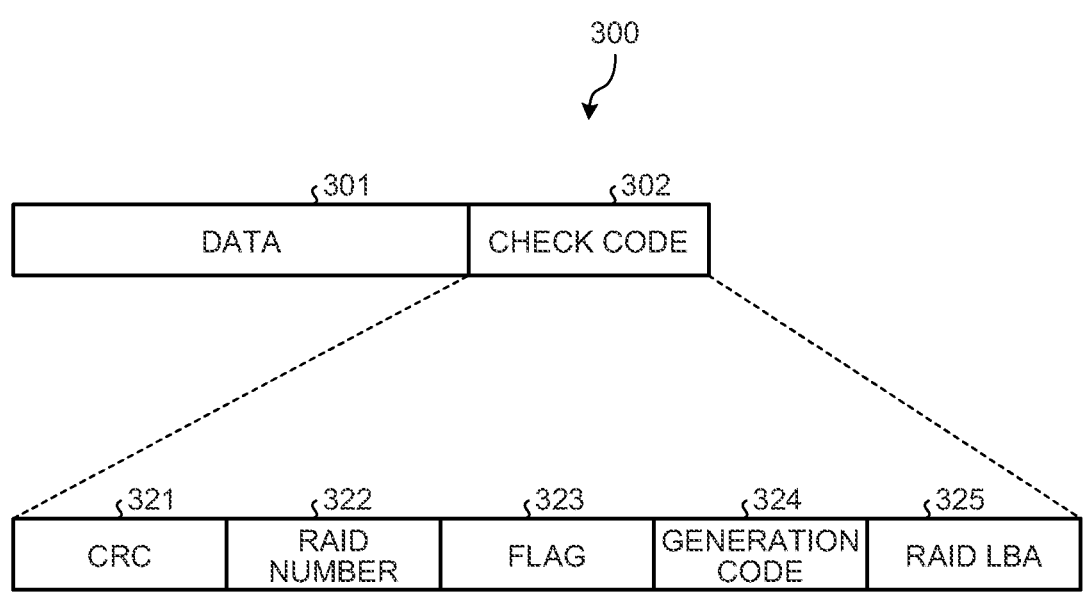
FIG. 5 is a diagram that illustrates a block datum added with the generation code.

Moreover, the generation-code managing unit 13 adds the generation codes that correspond to the respective block data described in the generation control block to the check codes of the respective block data described in the data caching unit 121. FIG. 5 is a diagram that illustrates a block datum added with the generation code. A block datum 300 added with the generation code by the generation-code managing unit 13 includes, as illustrated in FIG. 5, an actual datum 301 and a check code 302. The check code 302 includes a CRC 321, a RAID number 322, a flag 323, a generation code 324, and a RAID LBA 325. The flag 323 indicates data validity/invalidity and parity. As described above, in the storage device according to the present embodiment, the generation code 324 indicative of the state of the updating is added to each of the block data included in writing data that are received from the host 2.

The data writing unit 15 determines, depending on the operation state of the storage unit 19 and the block-data accumulation state of the data caching unit 121, the timing when block data are written back. The data writing unit 15 then transmits the identification information for identifying the block data to be written back to the generation-code managing unit 13.

The data writing unit 15 acquires block data added with the generation codes from the data caching unit 121. The data writing unit 15 writes the writing data to the storage unit 19 in accordance with the addresses indicated by the RAID numbers and the RAID LBAs that are described in the check codes of the block data.

Figure 6:
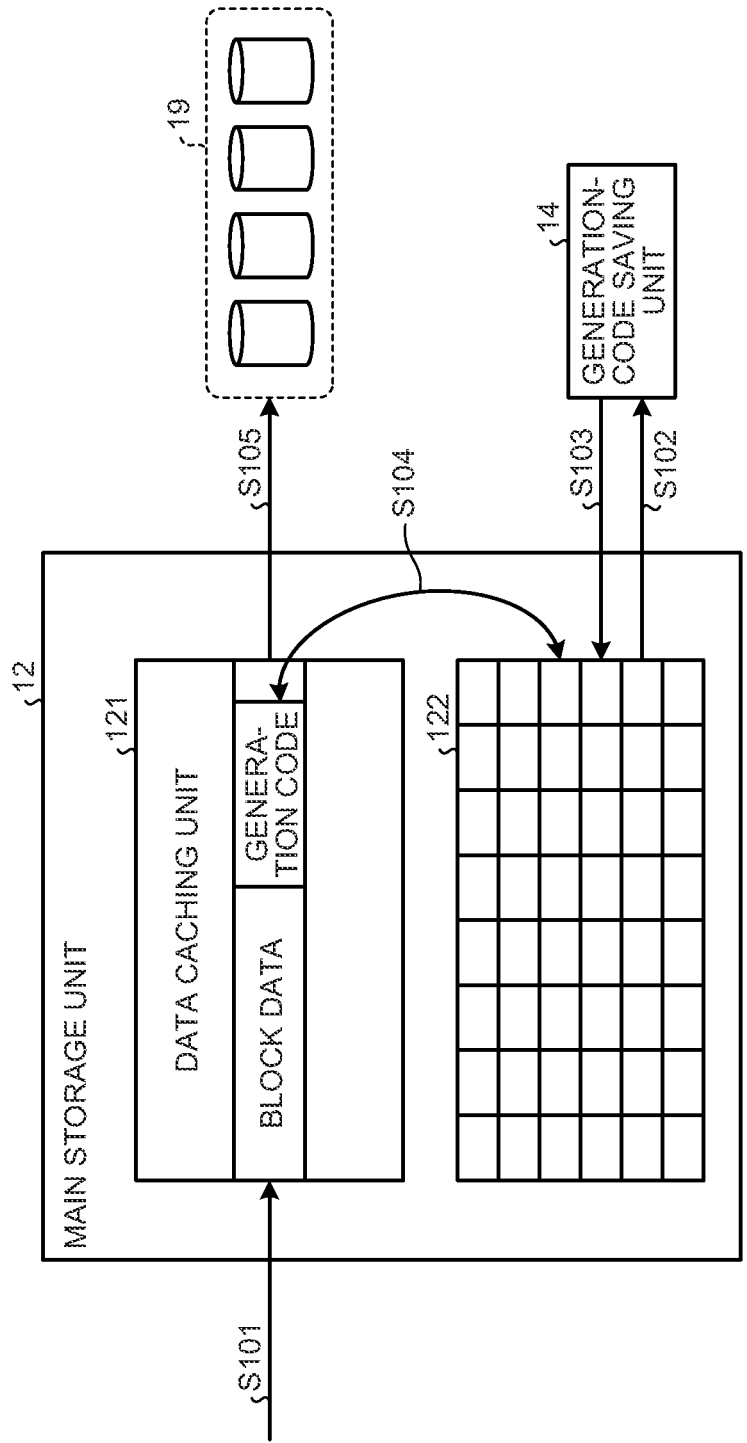
FIG. 6 is a diagram that explains a data writing process.

FIG. 6 is a diagram that explains a data writing process. The overview of the data writing process performed by the storage device 1 will be explained with reference to FIG. 6 according to the present embodiment.

Firstly, block data included in writing data are stored in the data caching unit 121 of the main storage unit 12 (Step S101). Then, the generation-code managing unit 13 determines whether a generation control block is present in the generation-code storage unit 122 that has the generation codes of block data indicated by a writing back notice. If the target generation control block is not present in the generation-code storage unit 122, the generation-code managing unit 13 reads the target generation control block from the generation-code saving unit 14. The generation-code managing unit 13 then moves a generation control block having the earliest access date-and-time from the generation-code storage unit 122 to the generation-code saving unit 14 (Step S102). The generation-code managing unit 13 stores the read generation control block in the generation-code storage unit 122 (Step S103). The generation-code managing unit 13 then increments by one the generation codes of the block data to be written back that are described in the generation control block that is stored in the generation-code storage unit 122 and updates the generation codes. This updating includes updating when the consecutive generation code is used. After that, the generation-code managing unit 13 updates the generation codes of the block data that are stored in the data caching unit 121 to the new generation codes that are described in the generation control block (Step S104). The block data added with the new generation codes are then stored in the storage unit 19 (Step S105).

Referring back to FIG. 2, the configuration and operation of the data reading side of the storage device 1 will be explained according to the present embodiment. The data reading unit 16 receives a data reading request from the host 2. Then, the data reading unit 16 reads specified data from the storage unit 19. The data includes one or more block data. The data reading unit 16 then stores the read data in the data cashing unit of the main storage unit 12.

The determining unit 17 refers to the data caching unit 121 for the block data that are read by the data reading unit 16 from the storage unit 19. The determining unit 17 searches for a generation control block that has the generation codes of received block data in the generation control blocks stored in the generation-code storage unit 122. The determining unit 17 makes the search by comparing the RAID number and the stripe number of blocks in which the received data are stored with the location-information section 201 of the generation control block 200 illustrated in FIG. 2. The stripe number is an identifier that is used to identify, when data in an RAID are separated into the same number of groups as the number of stripes, a group to which a datum belongs.

If a generation control block is not present in the generation-code storage unit 122 that has the generation codes of the block data included in the received data, the determining unit 17 reads, from the generation-code saving unit 14, a generation control block that has the generation codes of the block data. The determining unit 17 then identifies, by using the access date-and-times stored in the generation-code storage unit 122, a generation control block that has the earliest access date-and-time. The determining unit 17 then moves the generation control block that has the earliest access date-and-time from the generation-code storage unit 122 to the generation-code saving unit 14. The determining unit 17 updates, by using the moved generation control block, a corresponding generation-code control table that is stored in the generation-code saving unit 14. The determining unit 17 then stores the read generation control block in the generation-code storage unit 122.

The determining unit 17 compares the generation code of each of the block data included in the received data with the generation code of the corresponding block datum described in the generation control block stored in the generation-code storage unit 122.

If the generation codes of the block data included in the received data are accordant with the respective generation codes that are described in the generation control block, the determining unit 17 outputs the identification information for identifying the received data to the data transmitting unit 18.

In contrast, if the generation codes of the block data included in the received data are not accordant with the generation codes that are described in the generation control block, the determining unit 17 determines that a miswriting has occurred in an HDD that stores therein the block data. The determining unit 17 in the present embodiment disconnects the HDD in which the miswriting has occurred. After that, the determining unit 17 instructs the storage unit 19 to perform a RAID degrading process.

Although the present embodiment has the functional configuration in which the determining unit 17 is separated from the generation-code managing unit 13, they can be formed as one unit. Moreover, in the present embodiment, the determining unit 17 performs the process of moving a generation control block from the generation-code saving unit 14 to the generation-code storage unit 122, the above process can be performed not by the determining unit 17 but by the generation-code managing unit 13. If the above process is performed by the generation-code managing unit 13, when the determining unit 17 determines that a generation control block is not present in the generation-code storage unit 122 that has the generation codes of the block data included in received data, it transmits a notice of this effect to the generation-code managing unit 13. Upon receiving the notice from the determining unit 17, the generation-code managing unit 13 performs the process of moving a generation control block from the generation-code saving unit 14 to the generation-code storage unit 122.

The data transmitting unit 18 receives identification information for identifying data from the determining unit 17. The data transmitting unit 18 then reads data having the received identification information from the data caching unit 121. After that, the data transmitting unit 18 transmits the read data to the host 2.

Figure 7:
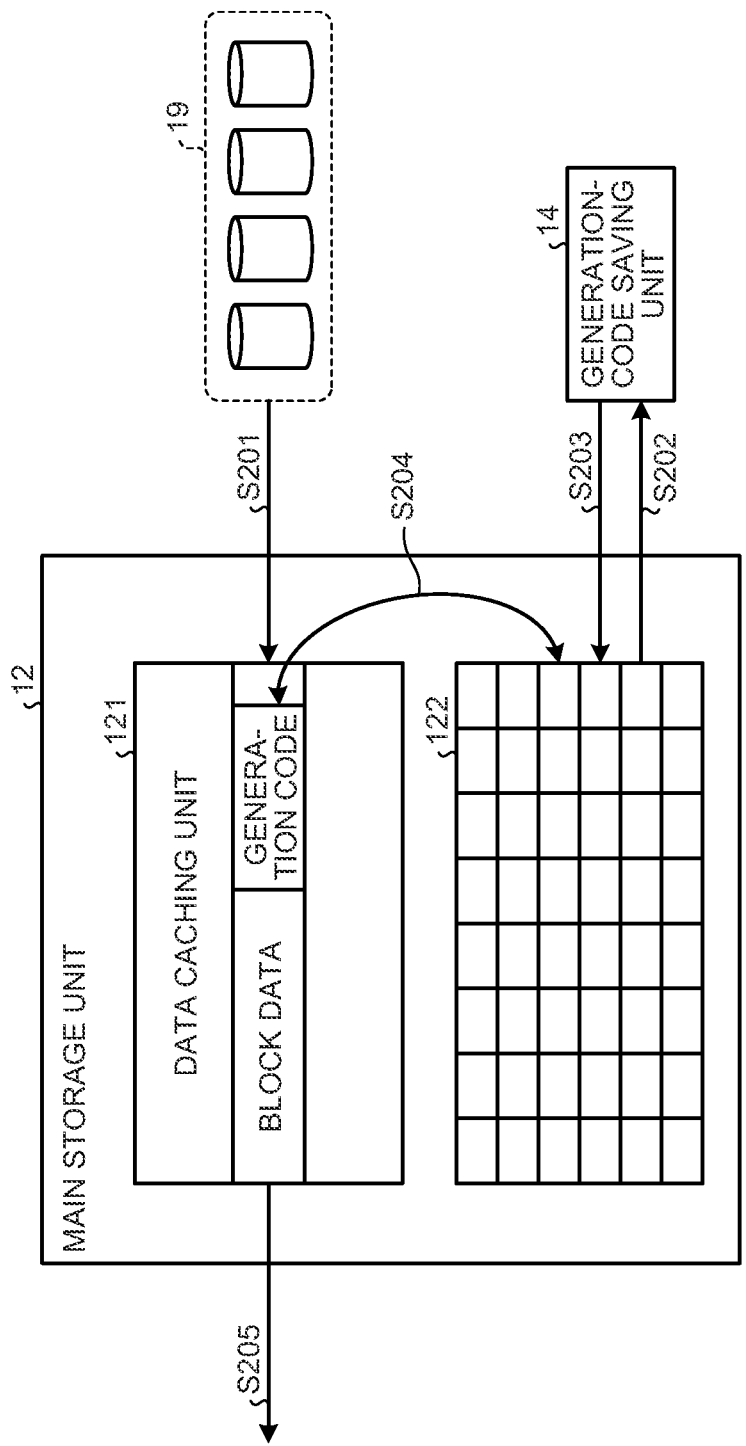
FIG. 7 is a diagram that explains a data reading process.

FIG. 7 is a diagram that explains a data reading process. The overview of the data reading process performed by the storage device will be explained with reference to FIG. 7 according to the present embodiment.

Firstly, data that are read by the data reading unit 16 from the storage unit 19 are stored in the data caching unit 121 of the main storage unit 12 (Step S201). Then, the determining unit 17 determines whether a generation control block is present in the generation-code storage unit 122 that has the generation code of each of the block data included in the read data. If the target generation control block is not present in the generation-code storage unit 122, the determining unit 17 reads the target generation control block from the generation-code saving unit 14. The determining unit 17 then moves a generation control block having the earliest access date-and-time from the generation-code storage unit 122 to the generation-code saving unit 14 (Step S202). The determining unit 17 stores the read generation control block in the generation-code storage unit 122 (Step S203). The determining unit 17 then compares the generation code of each of the block data included in the read data with the generation code of the corresponding block datum described in the generation control block stored in the generation-code storage unit 122 (Step S204). If the determining unit 17 determines that the generation codes are the same, the data transmitting unit 18 transmits the data stored in the data caching unit 121 to the host 2 (Step S205). In contrast, if the determining unit 17 determines that the generation codes are different from each other, the determining unit 17 determines that a miswriting has occurred. The determining unit 17 then disconnects an HDD in which the miswriting has occurred. After that, the determining unit 17 instructs the storage unit 19 to perform the RAID degrading process.

Figure 8:
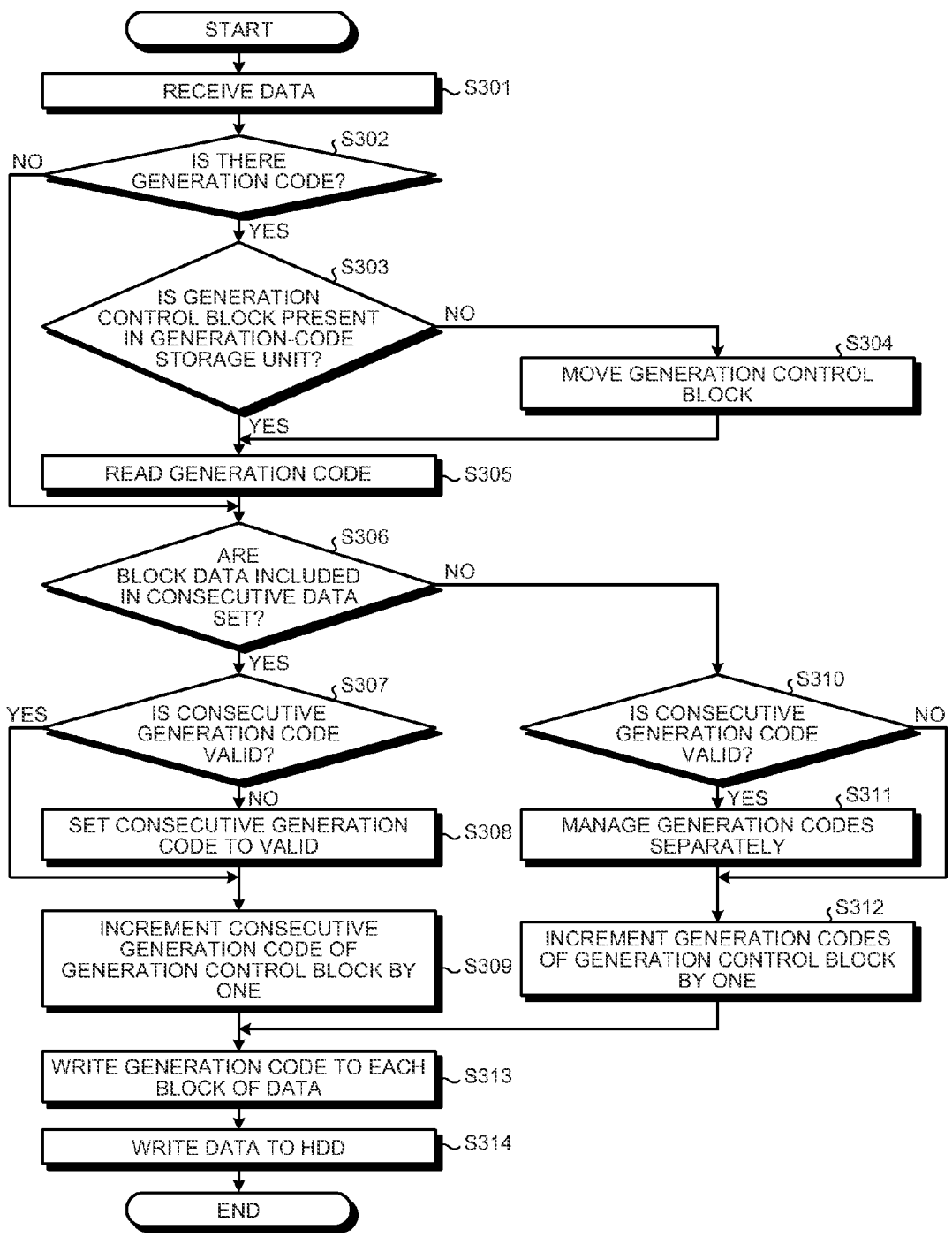
FIG. 8 is a flowchart of the writing process performed by the storage device according to the first embodiment.

The flow of the writing process performed by the storage device will be described below with reference to FIG. 8 according to the present embodiment. FIG. 8 is a flowchart of the writing process performed by the storage device according to the first embodiment.

The data receiving unit 10 receives writing data from the host 2 (Step S301). The check-code adding unit 11 then adds any check codes other than the generation code to each of the block data included in the writing data and stores them in the data caching unit 121. The generation-code managing unit 13 then waits for a notice for writing back to the storage unit 19 being received from the data writing unit 15.

The generation-code managing unit 13 determines whether block data to be written back have the generation codes added therewith (Step S302). If the generation codes are added therewith (Yes at Step S302), the generation-code managing unit 13 determines whether a generation control block is present in the generation-code storage unit 122 that has the generation codes of the block data (Step S303). If the target generation control block is not present in the generation-code storage unit 122 (No at Step S303), the generation-code managing unit 13 then moves the target generation control block from the generation-code saving unit 14 to the generation-code storage unit 122 (Step S304). The generation-code managing unit 13 also moves a generation control block having the earliest access date-and-time from the generation-code storage unit 122 to the generation-code saving unit 14.

If the target generation control block is present in the generation-code storage unit 122 (Yes at Step S303), the generation-code managing unit 13 reads the generation codes of the block data from the generation-code storage unit 122 (Step S305). After the generation control block is moved from the generation-code saving unit 14 to the generation-code storage unit 122, the generation-code managing unit 13 reads the generation codes of the block data from the generation-code storage unit 122 (Step S305).

If no generation codes are added to the block data to be written back, yet (No Step S302), the process control goes to Step S306.

The generation-code managing unit 13 determines whether any consecutive data set that is made up of block data included in the writing data includes the block data to be written back (Step S306).

If the block data to be written back are included in the consecutive data set (Yes at Step S306), the generation-code managing unit 13 refers to the consecutive flag of a generation control block that has the generation codes of the block data. The generation-code managing unit 13 then determines whether the consecutive generation code is valid (Step S307). If the consecutive generation code is invalid (No at Step S307), the generation-code managing unit 13 switches the consecutive flag of the generation control block, thereby switching the consecutive generation code to valid (Step S308). In contrast, if the consecutive generation code is valid (Yes at Step S307), the process control goes to Step S309.

The generation-code managing unit 13 increments the consecutive generation code of the generation control block by one (Step S309).

In contrast, the block data to be written back are not included in the consecutive data set, (No at Step S306), the generation-code managing unit 13 refers to the consecutive flag of a generation control block that includes the generation codes of the block data. The generation-code managing unit 13 then determines whether the consecutive generation code is valid (Step S310). If the consecutive generation code is valid (Yes at Step S310), the generation-code managing unit 13 switches the consecutive flag of the generation control block, thereby switching the consecutive generation code to invalid and thereby managing the generation codes separately (Step S311). In contrast, the consecutive generation code is invalid (No at Step S310), the process control goes to Step S312.

The generation-code managing unit 13 increments by one the generation code of each of the blocks in the written data of the consecutive generation code of the target generation code table (Step S312).

The generation-code managing unit 13 then writes the generation codes to the respective block data to be written back (Step S313).

The data writing unit 15 writes the block data added with the generation codes to the storage unit 19 (Step S314).

Figure 9:
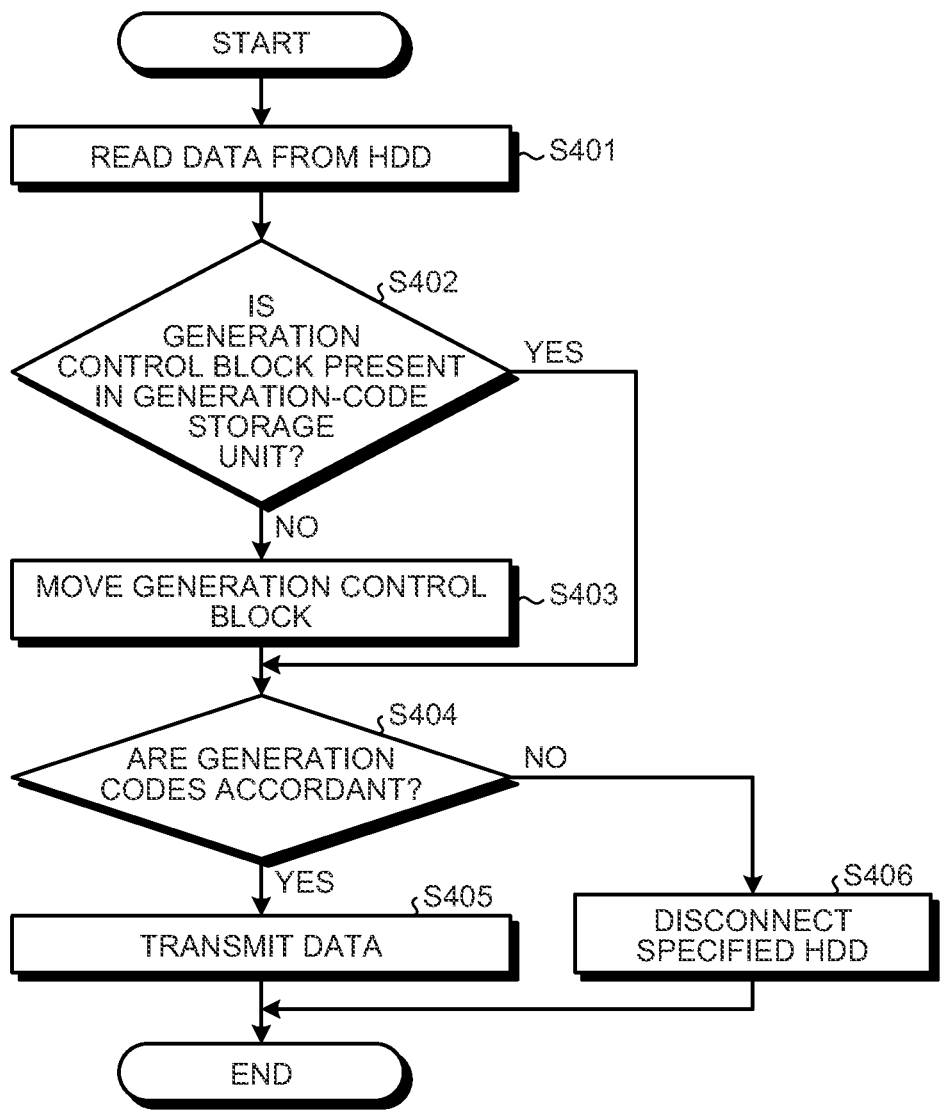
FIG. 9 is a flowchart of the reading process performed by the storage device according to the first embodiment.

The flow of the reading process performed by the storage device will be described below with reference to FIG. 9 according to the present embodiment. FIG. 9 is a flowchart of the reading process performed by the storage device according to the first embodiment.

The data reading unit 16 receives a request from the host 2 and reads specified data from an HDD of the storage unit 19 (Step S401). The data reading unit 16 then stores the read data in the data caching unit 121.

The determining unit 17 determines whether a generation control block is present in the generation-code storage unit 122 that has the generation code of each of the block data included in the data written to the data caching unit 121 (Step S402). If the target control block is present (Yes at Step S402), the process control goes to Step S404. In contrast, if the target generation control block is not present (No at Step S402), the determining unit 17 moves the target generation control block from the generation-code saving unit 14 to the generation-code storage unit 122 (Step S403). The determining unit 17 also moves a generation control block having the earliest access date-and-time from the generation-code storage unit 122 to the generation-code saving unit 14.

The determining unit 17 determines whether the generation codes of the block data included in the read data are accordant with the generation codes described in the generation control block (Step S404). If the block data included in the read data have the accordant generation codes (Yes at Step S404), the data transmitting unit 18 transmits the data to the host 2 (Step S405).

In contrast, if any of the block data included in the read data have a discordant generation code (No at Step S404), the determining unit 17 disconnects an HDD including the block (Step S406). After that, the storage device 1 performs the process of degrading HDDs of the RAID.

Figure 10:
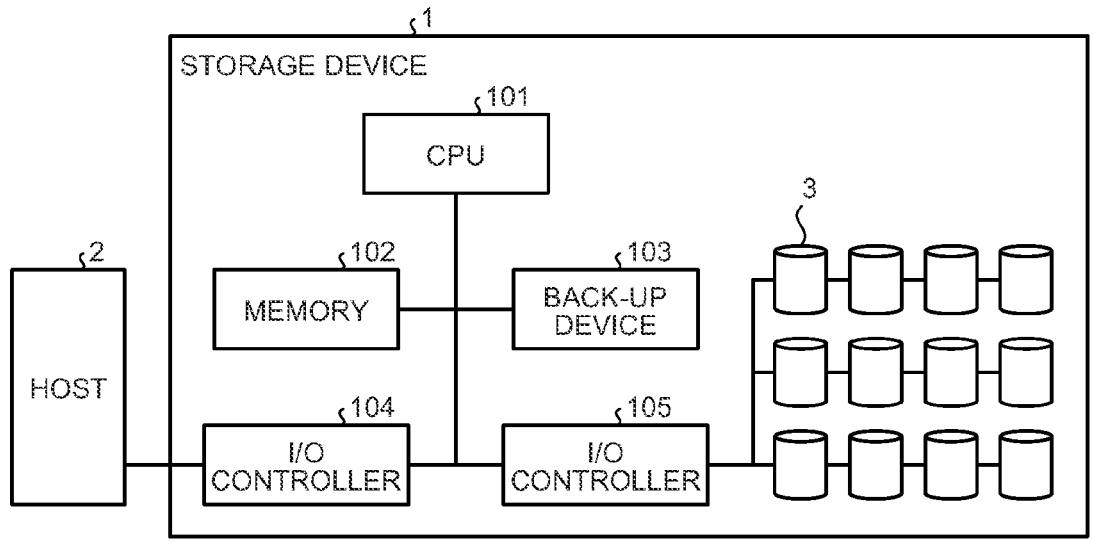
FIG. 10 is a diagram of the hardware configuration of the storage device according to the first embodiment.

FIG. 10 is a diagram of the hardware configuration of the storage device according to the first embodiment. The storage device 1 of the present embodiment includes, as illustrated in FIG. 10, a CPU 101, a memory 102, a back-up device 103, I/O controllers 104 and 105, and a plurality of HDDs 3.

The CPU 101 has the functions of the check-code adding unit 11, the generation-code managing unit 13, and the determining unit 17. Moreover, the CPU 101 controls the above-mentioned processes performed by the storage device 1. The memory 102 has the function of the main storage unit 12. The back-up device 103 has the function of the generation-code saving unit 14. The I/O controller 104 has the functions of the data receiving unit 10 and the data transmitting unit 18. The I/O controller 105 has the functions of the data writing unit 15 and the data reading unit 16. The HDDs 3 together operate the storage unit 19.

As described above, the storage device according the present embodiment adds, when data are written to an HDD, a generation code indicative of the state of the updating to each of blocks and checks, when data are read, the generation codes of blocks, thereby detecting any miswriting of data. Especially, if blocks are consecutive blocks that occupy an entire stripe, which is a section of a RAID, the storage device according the present embodiment treats the blocks as one set and adds one generation code to the set. If blocks are not consecutive blocks that occupy an entire stripe, the storage device adds the generation code to each of the blocks. Therefore, the processing load for adding the generation codes and the processing load for checking data by using the generation codes are reduced. Accordingly, the processing load for detecting any miswriting is reduced, while the reliability remains at a high level.

In the present embodiment, from the perspectives of writing and reading data to/from a hard disk, the "predetermined number" of data that form a consecutive data set is equal to the number of stripes, and if consecutive data are present that occupy an entire stripe of a RAID, the data are treated as a consecutive data set. However, the number of consecutive data that are treated as a consecutive data set can be some other values. For example, a consecutive data set can include block data that occupy two stripes or 1000 block data.

[b] Second Embodiment

A storage device according to the second embodiment will be explained below. The storage device according to the present embodiment is different from the storage device according to the first embodiment in that a hash table and an LRU link are used to achieve efficient data reading. The block diagram of the storage device according to the present embodiment is the same as the block diagram illustrated in FIG. 1. The corresponding components that are denoted with the same reference numerals as those of the first embodiment have the same functions, unless otherwise specified.

Figure 11:
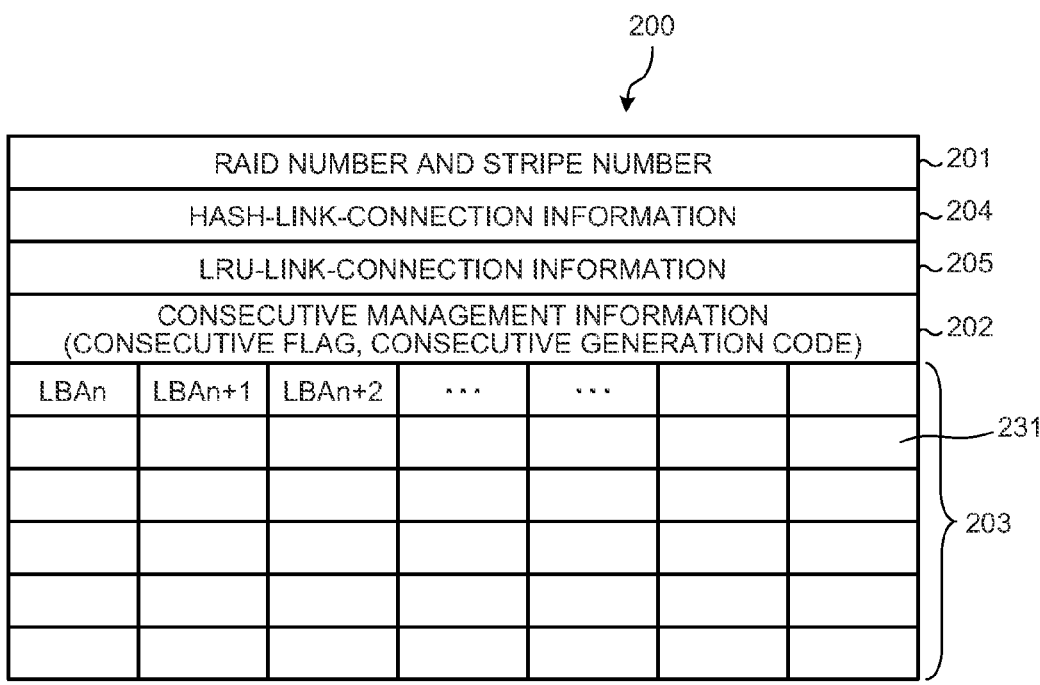
FIG. 11 is a table of an example of the generation control blocks that are used in a storage device according to the second embodiment.

FIG. 11 is a table of an example of the generation control blocks that are used in the storage device according to the second embodiment. Each of the generation control blocks 200 of the present embodiment has not only the sections of the generation control blocks of the first embodiment illustrated in FIG. 2 but also a hash-information section 204 and an LRU-link-connection-information section 205. The hash-information section 204 has hash-link-connection information described therein. The hash-link-connection information is information indicative of a hash value on a hash table in which the generation control blocks 200 are linked. A hash value is created by using RAID number, RAID LBA, and Block Count as keys. The "Block Count" is a value indicative of the number of sectors that form a block datum. In this example, the "Block Count" indicates the memory capacity of a section assigned with one RAID LBA.

Figure 12:
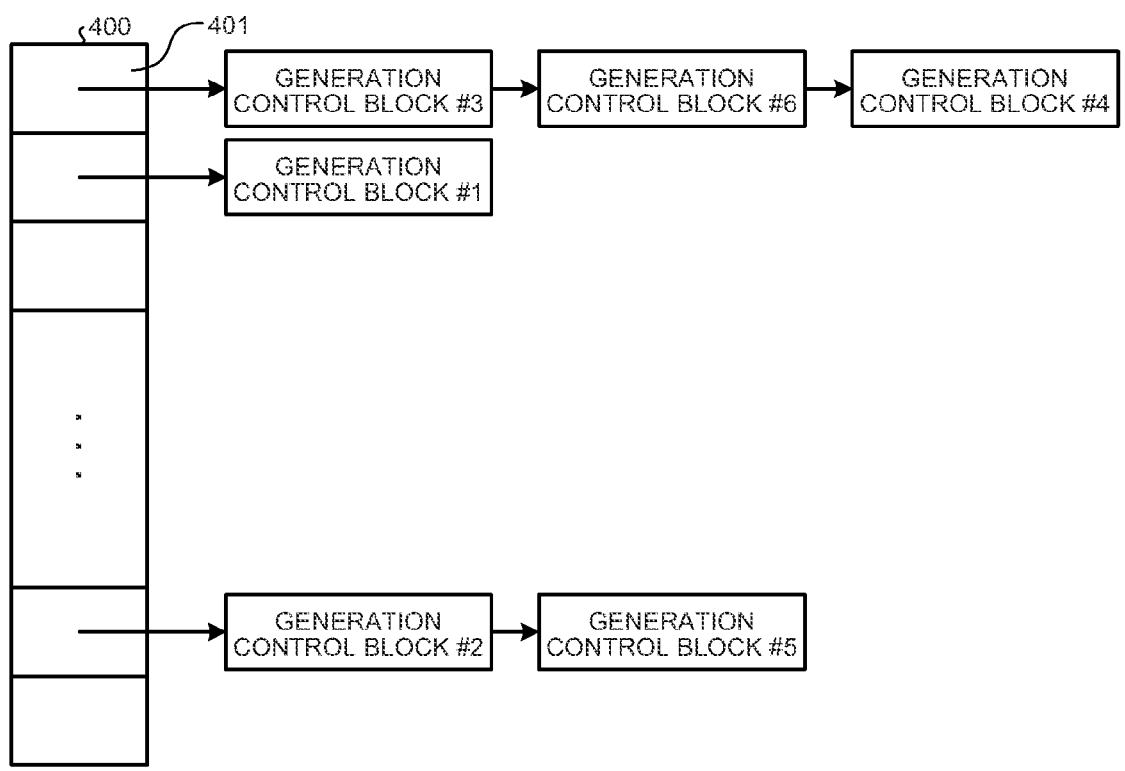
FIG. 12 is a table of an example of a hash table.

FIG. 12 is a table of an example of the hash table. The generation-code managing unit 13 stores therein a hash table like the table illustrated in FIG. 12. As illustrated in FIG. 12, a hash table 400 according to the present embodiment has a link structure in which a plurality of generation control blocks hangs down from each hash value. The sign "#n" added to each of the generation control blocks at their back is an identifier of the generation control block. The structure will be described with reference to, for example, a hash value that is described in a field 401 of the hash table 400. To the hash value that is described in the field 401, a generation control block #3, then a generation control block #6, and then a generation control block #4 are linked in series.

The generation-code managing unit 13 calculates a hash value by using, as keys, the RAID number, the RAID LBA, and the Blok Count that are assigned by the data receiving unit 10. The generation-code managing unit 13 then refers to the hash table by the calculated hash value, and determines whether a generation control block to be accessed is loaded on the generation-code storage unit 122. This will be explained more particularly with an example in which the generation-code managing unit 13 makes a search by a block whose generation code is described in the generation control block #6. The generation-code managing unit 13 calculates a hash value in accordance with the RAID number, the RAID LBA, and the Blok Count assigned to the block. In this example, the generation-code managing unit 13 calculates the hash value of the field 401 of the hash table 400. The generation-code managing unit 13 then searches for the hash value of the field 401 in the hash table. The generation-code managing unit 13 searches generation control blocks that are linked to the hash value of the field 401 sequentially from the head. First, the generation-code managing unit 13 checks, for the search, whether the generation code of the block datum is present in the generation control block #3. As described above, the generation code of the block datum is not present in generation control block #3. Then, the generation-code managing unit 13 searches the generation control block #6. The generation-code managing unit 13 detects that the generation code of the block datum is present in the generation control block #6. The generation-code managing unit 13 then determines whether the generation control block is loaded on the generation-code storage unit 122.

As described above, when compared with a search for a generation control block to be accessed by checking, without using the hash table, all the generation control blocks one by one, a search using the hash table increases the access speed to a target generation control block.

Figure 13:
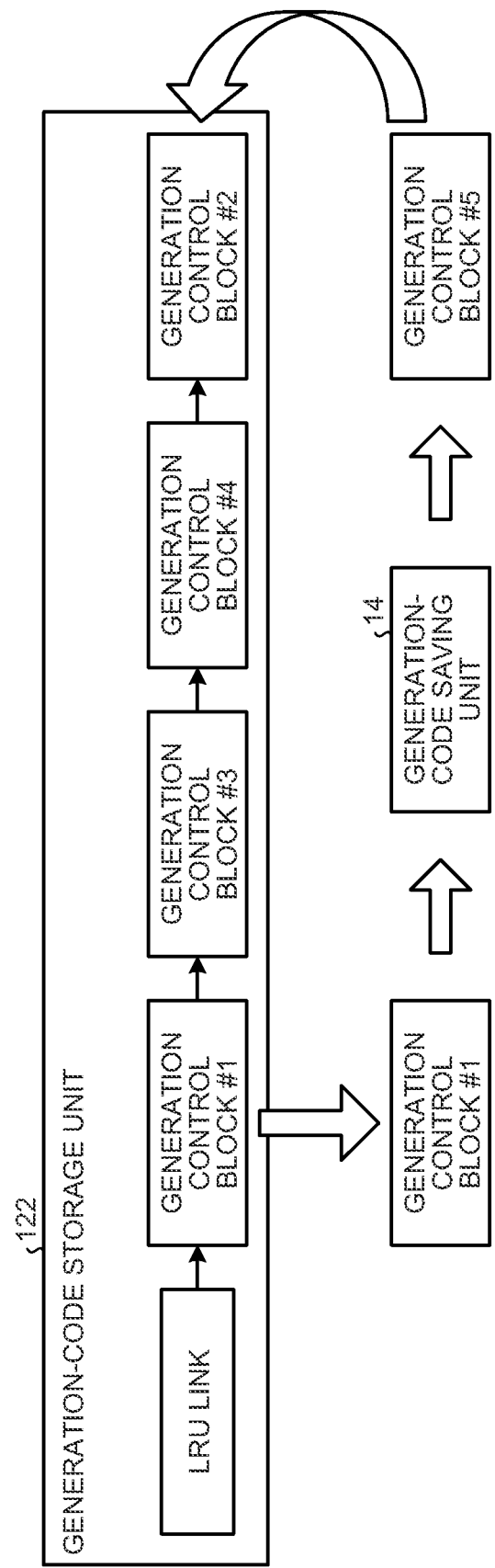
FIG. 13 is a diagram that explains a method of storing a generation control block in the storage device according to the second embodiment.

FIG. 13 is a diagram that explains the method of storing a generation control block in the storage device according to the second embodiment. In the storage device according to the present embodiment, as illustrated in FIG. 13, the generation-code storage unit 122 stores therein generation control blocks that are aligned in the ascending order according to access date-and-time by using an LRU (Least Recently Used) method.

More particularly, as illustrated in FIG. 11, LRU-link-connection information is described in the LRU-link-connection-information section 205 of the generation control block 200. The LRU connection information is information indicative of the sequence of generation control blocks that are aligned in the ascending order according to date-and-time and that are stored in the generation-code storage unit 122. If the generation-code storage unit 122 is as illustrated in FIG. 13, the generation control block #1 has the earliest access date-and-time, followed by the generation control block #3, and then the generation control block #4, and finally the generation control block #2, which has the latest access date-and-time.

When a search is made for a specified generation control block in the generation-code storage unit 122, the generation-code managing unit 13 searches generation control blocks sequentially in the descending order according to access date-and-time in accordance with the LRU connection information. If, for example, a search is made for the generation control block #4, the generation-code managing unit 13 checks the generation control block #2, first and then checks the generation control block #4, and finishes the search.

If the specified generation control block is not present in the generation-code storage unit 122, the generation-code managing unit 13 reads the specified generation control block from the generation-code saving unit 14 and stores it in the generation-code storage unit 122. The generation-code managing unit 13 also picks up a generation control block that has the earliest access date-and-time from LRU-link-connection information and stores it in the back-up device. The generation-code managing unit 13 acquires the specified generation control block from the generation-code saving unit 14, adds a value to the acquired generation control block as the LRU-link-connection information, the value indicating that the access date-and-time thereof is the latest, and then stores it in the generation-code storage unit 122. An example will be described below in which the generation-code managing unit 13 moves the generation control block #5 to the main storage unit 12 that is in the state as illustrated in FIG. 13. The generation-code managing unit 13 picks up, by using the LRU connection information, the generation control block #1, which has the earliest access date-and-time, from the main storage unit 12 and writes it to the generation-code saving unit 14. The generation-code managing unit 13 then reads the generation control block #5 from the generation-code saving unit 14, adds a value to the generation control block as the LRU-link-connection information, the value indicating that the access date-and-time thereof is the latest, and then stores it in the generation-code storage unit 122. In the image illustrated in FIG. 13, the generation control block #5 is added to the back of the aligning link. When a generation control block that is in the middle of the link sequence is used, the generation-code managing unit 13 picks up the specified generation control block, and adds a value to the generation control block as the LRU-link-connection information, the value indicating that the access date-and-time thereof is the latest, and then stores it in the generation-code storage unit 122.

Because the generation control blocks are stored by using the LRU method, a generation control block is found more quickly as the access frequency thereof is increased. Therefore, the total processing speed of the writing processes and the reading processes, which are repeatedly performed, is increased.

Moreover, the determining unit 17 stores therein a hash table like the table illustrated in FIG. 12. The determining unit 17 calculates the hash value by using the RAID number, the RAID LBA, and the Blok Count assigned to a block as keys. The determining unit 17 then refers to the hash table by the calculated hash value and determines whether a generation control block to be accessed is loaded on the generation-code storage unit 122.

Moreover, when a search is made for a specified generation control block in the generation-code storage unit 122, the determining unit 17 searches generation control blocks sequentially in the descending order according to access date-and-time in accordance with the LRU connection information.

As described above, the storage device according to the present embodiment makes a search for a generation control block by using the hash table and the LRU method. With this configuration, the efficiency in searching for a generation control block is increased and the speed at writing and reading data to/from the storage device is increased.

Exemplary modifications of the above-mentioned embodiments are described as follows.

Firstly, when the storage device 1 is powered off, the generation-code managing unit 13 moves generation control blocks stored in the generation-code storage unit 122 to the generation-code saving unit 14. With the moving, the generation control blocks stored in the generation-code saving unit 14 are updated. After all the generation control blocks are moved, the storage device 1 is powered off.

With this configuration, even if a generation control block is on the memory when the power is switched off, the information included in the generation control block is maintained. Therefore, when the storage device is rebooted after a power-off, an effective error check is made for any miswriting, etc.

The storage device 1 can have a battery for power failure. When a power failure occurs, an electric power is supplied from the battery to a controller board that includes the CPU 101, the memory 102, the back-up device 103, and the I/O controllers 104 and 105. During a battery driving period, the generation control blocks stored in the generation-code storage unit 122 are moved to the generation-code saving unit 14.

With this configuration, even if a generation control block is on the memory when a power failure occurs, the information included in the generation control block is maintained. Therefore, even if a power failure occurs, an effective error check is made for any miswriting, etc., after the power is restored.

According to an aspect of the storage device and the storage-device control method of the present invention, the processing load for detecting any miswriting is reduced, while the reliability remains at a high level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
   a processor;
   a memory;
   a first input output (I/O) controller;
   a second I/O controller; and
   a storage unit;
   wherein the first I/O controller receives write data including at least one block datum having a predetermined size, and
       when the processor determines that generation codes indicative of a state of updating of the block datum are accordant, transmits a read block datum or a consecutive data set;
   wherein the memory stores therein generation control information, the generation control information includes;
   a flag indicating whether a consecutive generation code is valid or invalid,
       when the flag is set to valid, the consecutive generation code of the consecutive data set in association with identification information for identifying the consecutive data set, and
       when the flag is set to invalid which indicates that each of the block datum is not part of a set of consecutive data, each block datum in the consecutive data set comprising a block datum generation code for identifying the respective block datum's current generation code;
   the generation control information is being assigned to the consecutive data set;
   when the processor detects a first consecutive data set in the write data that includes a predetermined number of consecutive block data, assigns a new consecutive generation code to the consecutive generation code and sets the flag to valid for the detected first consecutive data set;
   when the processor detects a non-consecutive data set in the write data, assigns a new generation code to the block datum generation code for each block datum in the non-consecutive data set and sets the flag to invalid for the detected non-consecutive data set;
   wherein when a flag of a specific consecutive data set is currently valid and is to be set to invalid, assigning the new generation code to the block datum generation code of a specific block datum included in the specific consecutive data set and assigning the consecutive generation code to the block data generation code of each of the other blocks of the specific consecutive data set, and further setting the flag of the specific consecutive data set from valid to invalid,
   determines whether each of the block datum generation code added to each of the block datum that is read by the I/O controller is accordant with a current generation code of the read block datum that is stored in the memory or the consecutive generation code added to the first consecutive data set that is read by the I/O controller is accordant with a current consecutive generation code of the first consecutive data set that is stored in the memory;
   the second I/O controller adds the new block datum generation code to each of the block datum and writes each of the block datum to the storage unit or the new consecutive generation code to the first consecutive data set and writes the first consecutive data to the storage unit, and
   reads each of the block datum or the first consecutive data set from the storage unit.

2. The storage device according to claim 1, wherein when a new consecutive generation code is assigned to the consecutive data set, the processor stores the new consecutive generation code in the memory in such a manner that the new consecutive generation code is in association with identification information for identifying the blocks of data that together form the consecutive data set, and when a new generation code is assigned to each of the block data, the processor stores the new generation code in the memory in such a manner that the new generation code is in association with identification information for identifying each of the corresponding block datum.

3. The storage device according to claim 1, wherein the storage unit includes a plurality of hard disks and has a RAID structure that is created by using the hard disks, and the consecutive data set is made of the same number of consecutive block data as the number of stripes of the RAID structure.

4. The storage device according to claim 1, further comprising a back-up device that has a capacity larger than the capacity of the memory and stores therein at least a saving generation control information that has the generation code of any block datum stored in the storage unit other than the block datum whose generation code is stored in the memory, wherein when the saving generation control information is present in the back-up device that has information indicative of the generation code of the block datum included in the writing data, the processor replaces the generation control information that has the earliest access date-and-time stored in the memory with the saving generation control information that has the information indicative of the generation code of the block datum included in the writing data.

5. The storage device according to claim 1, wherein the processor has information that contains a storage location of the generation control information, the processor searches for the generation control information by using the information.

6. A storage-device, which has a processor, a memory, a input output (I/O) controller, and a storage unit, control method comprising:
   the I/O controller receiving write data including at least one block datum having a predetermined size;
   a flag indicating whether a consecutive generation code is valid or invalid,
       when the flag is set to valid, the consecutive generation code of a consecutive data set in association with identification information for identifying the consecutive data set which comprises each block datum in a consecutive data set, and
       when the flag is set to invalid which indicates that each of the block datum is not part of a set of consecutive data, each block datum in the consecutive data set comprising a block datum generation code for identifying the respective block datum's current generation code;
   the processor detecting a first consecutive data set in the write data that includes a predetermined number of consecutive block data,
   assigning a new consecutive generation code to the consecutive generation code and set the flag to valid for the detected first consecutive data set;
   the processor detecting a non-consecutive data set in the write data, assigning a new generation code to the block datum generation code for each block datum in the non-consecutive data set and set the flag to invalid for the non-consecutive data set;

wherein when a flag of a specific consecutive set is currently valid and is to be set to invalid, assigning the new generation code to the block datum generation code of a specific block datum included in the specific consecutive data set and assigning the consecutive generation code to the block datum generation code of each of the other blocks of the specific consecutive data set and further setting the flag of the specific consecutive data set from valid to invalid;

the I/O controller adding the new block datum generation code to each of the block datum and then writing it to a storage unit or the new consecutive generation code to the first consecutive data set and then writing it to the storage unit the I/O controller reading each of the block datum or the first consecutive data set from the storage unit;

the processor determining whether each of the block datum generation code added to the each of the block datum is accordant with a current generation code of a read block datum that is stored in memory or the consecutive generation code added to the first consecutive data set is accordant with a current consecutive generation code of a consecutive data set that is stored in the memory; and when the generation codes are accordant, the I/O controller transmitting the read block datum or the consecutive data set.

7. The storage device according to claim 1, wherein the generation control information includes Least Recently Used (LRU)-link-connection information, the processor searches the generation control information sequentially in a descending order according to access data-and-time in accordance with the LRU-link-connection information.

* * * * *